United States Patent
Abel

[15] 3,655,249
[45] Apr. 11, 1972

[54] PACKAGE SLEEVE BEARING

[72] Inventor: Martin L. Abel, 25235 Canterbury, Franklin, Mich. 48025

[22] Filed: Jan. 30, 1970

[21] Appl. No.: 7,032

[52] U.S. Cl. ................................................308/72, 308/121
[51] Int. Cl. ......................................F16c 9/06, F16c 33/66
[58] Field of Search ..................................308/121, 72, 240

[56] References Cited

UNITED STATES PATENTS

| | | | |
|---|---|---|---|
| 3,256,049 | 6/1966 | Josephson et al. | 308/240 |
| 3,294,456 | 12/1966 | Williams et al. | 308/240 |
| 2,488,775 | 11/1949 | Heim | 308/72 |
| 2,478,056 | 8/1949 | Reeg | 308/72 |

OTHER PUBLICATIONS

Product Engineering "Aluminum Bearings," pages 128– 130 February, 1946.

*Primary Examiner*—Edgar W. Geoghegan
*Assistant Examiner*—Frank Susko
*Attorney*—Lane, Aitken, Dunner & Ziems

[57] ABSTRACT

A self-contained, hydrodynamically lubricated, package sleeve bearing having inner and outer races similar to the inner and outer races of ball bearings. The outer race is rotatably journaled on the inner race by a plurality of arcuate aluminum bearing elements. A wicking material impregnated with a special oil for lubricating aluminum bearing surfaces is packed in the bearing and the bearing is closed in a way to contain and recirculate the oil.

20 Claims, 4 Drawing Figures

Patented April 11, 1972 3,655,249

INVENTOR
MARTIN L. ABEL

BY Lane, Aitken, Dunner & Ziems
ATTORNEYS

PACKAGE SLEEVE BEARING

BACKGROUND OF THE INVENTION

This invention relates to sleeve bearings and more particularly to a self contained package sleeve bearing which can be marketed in the same manner as, and used in place of, ball bearings.

My earlier U.S. Pat. No. 2,761,746 granted on Sept. 4, 1956, entitled Pillow Block discloses a self-contained package sleeve bearing which employs a sintered metal bearing material having a low PV rating, the PV rating being the product of the load on the bearing in pounds per square inch multiplied by the surface velocity in feet per minute. The patent to Josephsen, et al. U.S. Pat. No. 3,256,049 granted on June 14, 1966, and entitled Sliding Surface Bearing discloses another type of package sleeve bearing and a method for making the bearing. It employs a sintered bearing material which is molded about the inner race under pressure. The sintered material is a special bearing material designed to increase the PV rating of the package sleeve bearing.

The inner and outer races of the Josephsen, et al. bearing are made of steel and are similar to the inner and outer races of ball bearings. The bearing is packed with an oil impregnated wicking material which is sealed in the bearing by rubber sealing rings. The bearing is designed to be made in a range of different sizes so that it can be marketed in the same manner as, and used in place of, ball and roller bearings.

SUMMARY OF THE INVENTION

The present invention provides a self-contained, self-lubricating package sleeve bearing of the type described above which is economical and simple in construction, and yet provides a high quality package sleeve bearing having a high PV rating. The bearing comprises a steel outer race rotatably journalled on a steel inner race by a solid aluminum metal bearing. It is packed with oil impregnated wicking material and recirculates the oil to lubricate the bearing substantially for the life of the bearing. The bearing oil is a special blend designed specifically for lubricating sliding aluminum bearing surfaces.

In the preferred embodiment, the aluminum metal bearing comprises a plurality of arcuate bearing elements cut and formed from an extruded aluminum wire or rod. The bearing elements are assembled between the inner and outer races in a manner to provide limited universal movement between the inner and outer races to compensate for shaft misalignment.

DESCRIPTION OF THE PREFERRED EMBODIMENTS

Figure 1:
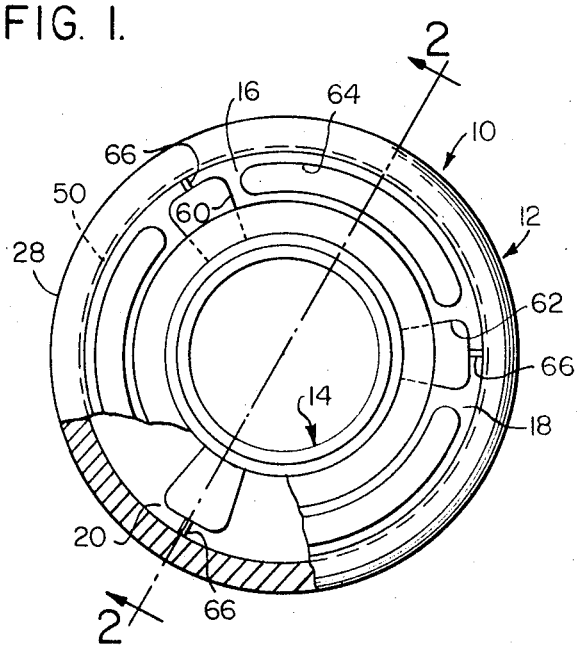
FIG. 1 is a view of one side of a package sleeve bearing embodying features of the invention.
Figure 2:
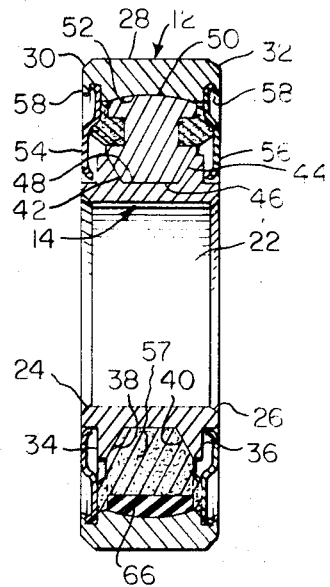
FIG. 2 is a sectional view taken along the line 2—2 of FIG. 1.
Figure 3:
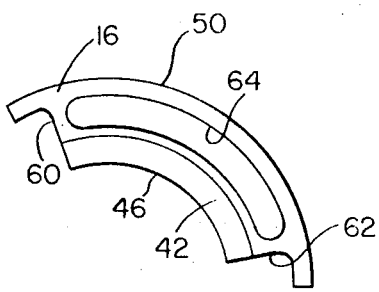
FIG. 3 is a perspective view of one of the arcuate bearing elements of the bearing of FIG. 1.

Referring to FIGS. 1-3, a package sleeve bearing 10 is shown which illustrates a preferred embodiment of the invention. It comprises an outer race 12, an inner race 14 and three arcuate bearing elements 16, 18 and 20 made of aluminum. The inner and outer races preferably are made of steel and are similar to the inner and outer races of conventional ball bearings.

The inner race has a cylindrical inner surface 22 chamfered at both ends as at 24 and 26. The outer race has a cylindrical outer surface 28 chamfered at both ends as at 30 and 32. The cylindrical surfaces 22 and 28 are carefully sized so that the bearing will fit accurately within a cylindrical bore in a supporting body for rotatably journalling a shaft on the body in the same manner as a ball bearing. The chamfers 30 and 32 facilitate the insertion of the outer race into the bore and the chamfers 24 and 26 facilitate the insertion of the shaft into the inner race.

The outer surface of the inner race 14 is cylindrical and is provided with a pair of axially spaced, radial flanges 34 and 36 positioned inwardly of the ends of the inner race. The flanges 34 and 36 have sloping, inwardly presenting, thrust surfaces 38 and 40 which slidably engage sloping thrust surfaces 42 and 44, respectively, on the arcuate bearing elements 16-20. The inner cylindrical surface 46 of each of the arcuate bearing elements slidably engages the portion of the outer cylindrical surface 48 of the inner race between the flanges 34 and 36.

Each of the bearing elements is formed with a spherical outer surface 50 which engages a spherical inner surface 52 on the outer race to provide limited universal movement between the inner and outer races to compensate for shaft misalignment. This movement is frictionally restrained by the tight fit between the parts so that the bearing elements are restrained against rotation relative to the outer race while the inner race rotates relative to the bearing elements.

A pair of washer shaped oil cups 54 and 56 are fixed in recesses in the ends of the outer race and the ends of the outer race are peaned over as at 58 to lock the oil cups in position. The inner periphery of each of the oil cups closely overlies the cylindrical surface of the inner race outwardly of the flanges 34 and 36. In the embodiment shown the oil cups 54 and 56 are made of metal and a slight clearance is provided at the inner race. However, if desired, the oil cups may be made out of a rubber or plastic material which engage the inner race in a manner to provide a sliding seal. An oil impregnating wicking material, which will be described in greater detail hereinafter, is packed in the space between the oil cups 54 and 56 and the arcuate bearing elements.

Since the bearing elements are identical, only the bearing element 16 shown in FIG. 3 in perspective will be described in detail. The ends of the bearing element 16 are notched as at 60 and 62 to cooperate with the adjacent bearing elements to provide axial slots between bearing elements which are filled with the oil impregnated. An arcuate recess 64 is formed in each side face of the bearing element. The outer surface is provided with the spherical surface 50, and the inner surface of the bearing element is provided with the cylindrical surface 46 and the sloping thrust surfaces 42 and 44, as previously described.

Each of the bearing elements is made from an extruded aluminum wire or rod having the cross section substantially as shown in FIG. 2, but without the arcuate recesses 64. The aluminum rod is cut to length and the notches 60 and 62 are cut out. The cut length of rod is then cold formed into the arcuate configuration by suitable dies. During the forming operation the arcuate recesses are coined or pressed into the sides of the arcuate element by male die elements which move axially toward one another and compress the bearing element therebetween. The coining of these arcuate recesses facilitates the movement of metal needed to form very accurately the final desired shape for the bearing element, including the spherical outer surface and the inner bearing and thrust surfaces.

As shown in FIG. 1 a slightly resilient spacer 66 is positioned between the abutting ends of each of the arcuate bearing elements. This facilitates assembly and enables the bearing elements to float a little and thus improve the fit with the bearing surface. To assemble the package sleeve bearing 10, two of the arcuate bearing elements are positioned on the inner race and this assembly is inserted into the outer race 12 with the axes of the inner and outer races perpendicular to one another, taking advantage of the gap in the space to be occupied by the third bearing element. After the inner race and two bearing elements have been inserted in this manner, and while the axes are still perpendicular, the inner race is rotated about its axis until the spherical surfaces on both bearing elements slidably engage the spherical inner surface of the outer race. This positions the gap between the two bearing elements outside of the outer race. The third bearing element is then positioned in this gap and the inner race is rotated so that its axis coincides with the axis of the outer race and all three bearing elements are positioned within the outer race. The oil impregnated wicking material is then packed in the bearing, as will be described, and the oil cups 54 and 56 are inserted and locked in position by the peaned over portions 58, as previously described.

The wicking material can be a felt or other wicking material, but preferably comprises cellulose fibers as described in my earlier patents, U.S. Pat. No. 2,966,459 granted on Dec. 27, 1960 and U.S. Pat. No. 3,466,244 granted on Sept. 9, 1969. However, the bearing oil which is mixed with these fibers is a bearing oil specially blended for lubricating aluminum bearings. Examples of such aluminum bearing oils are described in U.S. Pat. No. 3,208,941 granted on Sept. 28, 1965 and entitled Olefin-Unsaturated Ester Lubricants, U.S. Pat. No. 3,208,940 granted on Mar. 19, 1962 and entitled Lubricating Compositions and Methods of Lubricating, and U.S. Pat. No. 3,280,027 granted on Dec. 29, 1965 and entitled Lubricants and Lubricated Structures. In the embodiment shown, the aluminum bearing oil is mixed with the cellulose fibers described in my earlier U.S. Pat. No. 3,466,244 to form a mixture of the aluminum bearing oil and fibers in the proportions described which can be injected in a well known manner into the assembled bearing. Since the oil impregnated wicking material used in the bearing 10 is the same as that described in my U.S. Pat. No. 3,466,244 with the exception that a known aluminum bearing oil is used in place of the bearing oil disclosed in my patent, the mixture will not be described in greater detail.

The aluminum oil impregnated wicking material fills the axial slots between the bearing elements and contacts the cylindrical surface 48 and the sloping thrust surfaces 38 and 40 of the inner race. The material also fills the coined arcuate recesses 64 and extends in a complete annulus of each face of the bearing elements so as to connect the material in the axial slots with the material in the coined arcuate recesses. Any oil which escapes from the thrust surfaces is thrown radially outward into the annulus of oil impregnated wicking material overlying each of the radial flanges 34 and 36 so that the oil is reabsorbed by the wicking material and recirculated back to the sliding bearing surfaces. This provides a completely self contained recirculating system which will lubricate the bearing for a long period of time.

Figure 4:
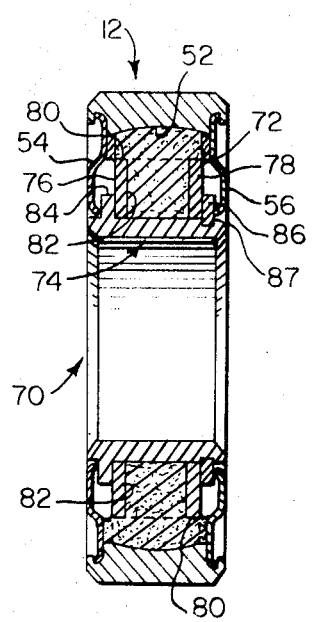
FIG. 4 is a sectional view similar to FIG. 2 illustrating another embodiment of the invention.

Referring to FIG. 4, a bearing 70 is shown which illustrates another embodiment of the invention. It comprises an outer race 12 identical to the outer race of the bearing 10, a one piece aluminum metal bearing element 72 and an inner race 74. The bearing element 72 has flat side walls 76 and 78 and a plurality of circumferentially spaced axial slots 80 which communicate with the spherical inner surface 52 of the outer race. A radial passage 82 is provided for communicating each of the axial slots 80 with the cylindrical outer surface of the inner race 74. A radial flange 84 near one end of the inner race slidably engages the face 76 of the bearing element 72. A washer shaped thrust element 86 is slipped on the other end of the inner race and is locked against a shoulder 88 on the inner race by the peaned over end 82 of the inner race.

With this construction the bearing ring can be slipped over the inner bearing race 74 against the flange 84 and the thrust element 86 thereafter locked in place to fix the bearing element against axial movement relative to the inner race.

As shown in FIG. 4 two of the axial slots 80 are diametrically opposed to one another. These diametrically opposed axial slots are wide enough to enable the one piece bearing element 72 to be inserted into the outer race 12 with its axis perpendicular to the axis of the outer race and, thereafter, rotated 90° to align the axes and retain the bearing ring within the outer race. The oil impregnated wicking material is packed in the bearing and the oil cups 54 and 56 are mounted on the outer race, as previously described. The oil impregnated wicking material fills the axial slots 80 and the radial passages 82 and forms complete annuluses on both end faces of the bearing ring.

The bearing element 72 can be machined from a block of cast aluminum or die cast from molten aluminum and then machined. Of course, The extruded wire or rod from which the bearing elements 16–20 are made also can be extruded from a cast aluminum workpiece. Therefore, the term cast as used in the following claims is used in the dictionary sense to describe a metal formed from molten metal solidified without pressure being applied thereto. The fact that the metal may thereafter be cold worked, rolled, hot worked, extruded or machined into another configuration does not change the fact that it is a cast metal as contrasted to a sintered metal, for example.

I claim:

1. A self-contained wick fed hydrodynamically lubricated, package sleeve bearing comprising an inner race having a cylindrical inner surface, an outer race encircling said inner race and having a cylindrical outer surface, bearing means between said inner and outer races and restrained against rotation about the axis of one of said races and adjustable relative to said one race in a manor to compensate for misalignment between said races, a sliding surface of said bearing means rotatably slidably engaging a sliding surface of the other of said races, one of the sliding surfaces comprising a cast aluminum metal surface, means for maintaining said inner and outer races and bearing means assembled and substantially coaxially aligned with one another, and wicking material impregnated with an aluminum bearing oil packed in said sleeve bearing in position to deliver the oil to said sliding surfaces.

2. The bearing as defined in claim 1 including means for retaining said wicking material and oil in said bearing and recirculating oil escaping from said sliding surfaces back into said wicking material.

3. The bearing as defined in claim 1 wherein said one sliding surface is on said bearing means and slidably engages the outer surface of said inner race.

4. The bearing as defined in claim 3 wherein said bearing means is made of cast aluminum metal.

5. The bearing as defined in claim 4 wherein said bearing means comprises a plurality of arcuate elements of aluminum metal.

6. The bearing as defined in claim 5 wherein said arcuate elements comprise short lengths of aluminum wire having a predetermined cross section and formed into an arcuate shape.

7. The bearing as defined in claim 6 including a pair of axially spaced thrust surfaces on said inner race slidably engaging outwardly presenting thrust surfaces on said arcuate elements for locking the arcuate elements and inner race against axial movement relative to one another.

8. The bearing as defined in claim 7 wherein said bearing means comprises at least three arcuate elements.

9. The bearing as defined in claim 4 wherein said bearing means has at least one axially extending slot in the bearing surface thereof which is filled with said oil impregnating wicking material.

10. The bearing as defined in claim 9 wherein said bearing means comprises a plurality of arcuate pieces of aluminum metal with the ends of each of said pieces cooperating with the ends of adjacent pieces to define a plurality of said axially extending slots filled with said oil impregnated wicking material.

11. The bearing as defined in claim 9 wherein the sides of said bearing elements have arcuate recesses filled with said oil impregnating wicking material.

12. The bearing as defined in claim 10 wherein said oil impregnated wicking material forms a complete annulus on each side of said bearing means with each annulus contacting the oil impregnating wicking material in said axial slots.

13. The bearing as defined in claim 12 including a washer shaped oil cup fixed within each end of said outer race for enclosing said wicking material.

14. The bearing as defined in claim 4 wherein the inner surface of said outer race is spherical and the outer surfaces of said bearing elements have a corresponding spherical surface to provide limited universal movement of said bearing elements and inner race relative to said outer race.

15. The bearing as defined in claim 14 wherein said bearing means comprises at least three arcuate bearing elements.

16. A package sleeve bearing comprising an inner race having cylindrical inner and outer surfaces, an outer race having an outer cylindrical surface and an inner spherical surface, and a plurality of arcuate bearing elements between said inner and outer races, said bearing elements defining an inner cylindrical surface slidably engaging the outer cylindrical surface of said inner race and also defining an outer spherical surface fitted within said inner spherical surface for universal movement relative thereto, said bearing elements being arranged and constructed to be mechanically locked against disassembly from one another and from said outer race when the axis thereof is substantially concentric with the axis of said outer race and to be assembled within said outer race by forming the bearing elements into a ring with the axis of the ring at an angle relative to the axis of said outer race, said bearing elements having a clearance therebetween to enable each bearing element to shift its position slightly relative to the other bearing elements, and the inner and outer races, and means for resiliently biasing said bearing elements apart from one another in a manner to expand the major diameter thereof to press the outer spherical surface of each of the bearing elements against the inner spherical surface of the outer race.

17. The bearing as defined in claim 16 including means for limiting the universal movement between said bearing elements and said outer race to maintain said bearing elements locked together within said outer race.

18. The bearing as defined in claim 5 wherein said bearing elements having a clearance therebetween to enable each bearing element to shift its position slightly relative to the other bearing elements, and the inner and outer races, and means for resiliently biasing said bearing elements apart from one another in a manner to expand the major diameter thereof to press the outer surface of each of the bearing elements against the inner surface of the outer race.

19. The bearing as defined in claim 13 wherein said bearing elements having a clearance therebetween to enable each bearing element to shift its position slightly relative to the other bearing elements and the inner and outer races, and means for resiliently biasing said bearing elements apart from one another in a manner to expand the major diameter thereof to press the outer spherical surface of each of the bearing elements against the inner spherical surface of the outer race.

20. The bearing as defined in claim 15 wherein said bearing elements having a clearance therebetween to enable each bearing element to shift its position slightly relative to the other bearing elements and the inner and outer races, and means for resiliently biasing said bearing elements apart from one another in a manner to expand the major diameter thereof to press the outer spherical surface of each of the bearing elements against the inner spherical surface of the outer race.

* * * * *